(12) United States Patent
Sondur et al.

(10) Patent No.: US 7,693,111 B2
(45) Date of Patent: *Apr. 6, 2010

(54) WIRELESS COMMUNICATION DEVICE AND METHOD FOR REDUCING CARRIER FREQUENCY OFFSETS OVER A SIMULTANEOUS MULTI-USER UPLINK IN A MULTICARRIER COMMUNICATION NETWORK

(75) Inventors: Lakshmipathi Sondur, Karnataka (IN); Keith A. Holt, El Dorado Hills, CA (US); Ashim Biswas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/190,009

(22) Filed: Aug. 12, 2008

(65) Prior Publication Data

US 2008/0317149 A1    Dec. 25, 2008

Related U.S. Application Data

(63) Continuation of application No. 11/172,451, filed on Jun. 29, 2005, now Pat. No. 7,426,199.

(51) Int. Cl.
*H04Q 7/00* (2006.01)
(52) U.S. Cl. ........................ 370/332; 370/352
(58) Field of Classification Search ........................ None
See application file for complete search history.

(56) References Cited

U.S. PATENT DOCUMENTS

| 5,274,841 | A | 12/1993 | Natarajan et al. |
| 5,818,872 | A | 10/1998 | Gupta |
| 5,896,561 | A | 4/1999 | Schrader et al. |
| 6,229,799 | B1 | 5/2001 | Caillerie et al. |
| 6,504,834 | B1 | 1/2003 | Fifield |
| 6,560,209 | B1 | 5/2003 | Alamouti et al. |
| 6,847,313 | B2 | 1/2005 | Biswas |
| 6,947,505 | B2 | 9/2005 | Learned |
| 7,006,530 | B2 | 2/2006 | Spinar et al. |
| 7,286,617 | B2 | 10/2007 | Vanderperren et al. |
| 7,313,189 | B2 | 12/2007 | Yoshida et al. |

(Continued)

FOREIGN PATENT DOCUMENTS

EP    1107620 A2    6/2001

(Continued)

OTHER PUBLICATIONS

"U.S. Appl. No. 11/172,452, Non-Final Office Action mailed Apr. 8, 2009", 12 pgs.

(Continued)

*Primary Examiner*—Lester Kincaid
*Assistant Examiner*—Phuoc Doan
(74) *Attorney, Agent, or Firm*—Schwegman, Lundberg & Woessner, P.A.; Gregory J. Gorrie

(57) ABSTRACT

Each of a plurality of multicarrier wireless communication devices generate a carrier frequency offset (CFO) estimate from a downlink polling frame (302) and apply the CFO estimate to signals prior to transmission to a receiving station over a multi-user uplink.

12 Claims, 7 Drawing Sheets

U.S. PATENT DOCUMENTS

| | | |
|---|---|---|
| 7,313,203 B2 | 12/2007 | Tubbax et al. |
| 7,324,607 B2 | 1/2008 | Guchhait |
| 7,327,800 B2 | 2/2008 | Oprea et al. |
| 7,352,819 B2 | 4/2008 | Lakshmipathi |
| 7,426,199 B2 | 9/2008 | Sondur et al. |
| 7,466,964 B2 | 12/2008 | Sondur |
| 7,480,497 B2 | 1/2009 | Biswas et al. |
| 2002/0181390 A1 | 12/2002 | Mody et al. |
| 2003/0152022 A1 | 8/2003 | Hosur |
| 2004/0005010 A1 | 1/2004 | He et al. |
| 2004/0048584 A1 | 3/2004 | Vaidyanathan et al. |
| 2005/0058215 A1 | 3/2005 | Biswas |
| 2005/0111427 A1* | 5/2005 | Li et al. ............ 370/343 |
| 2005/0129101 A1 | 6/2005 | Stephens et al. |
| 2005/0144307 A1 | 6/2005 | Li et al. |
| 2005/0147115 A1 | 7/2005 | Li et al. |
| 2005/0195790 A1 | 9/2005 | Learned et al. |
| 2005/0281241 A1 | 12/2005 | Webster et al. |
| 2006/0014494 A1 | 1/2006 | Vanderperren et al. |
| 2006/0045062 A1 | 3/2006 | Gorokhov et al. |
| 2006/0045220 A1 | 3/2006 | Biswas |
| 2006/0120395 A1 | 6/2006 | Xing et al. |
| 2006/0222095 A1 | 10/2006 | Niu et al. |
| 2007/0002749 A1 | 1/2007 | Sondur et al. |
| 2007/0002800 A1 | 1/2007 | Sondur et al. |
| 2007/0004337 A1 | 1/2007 | Biswas et al. |
| 2007/0004347 A1 | 1/2007 | Sondur |
| 2007/0104221 A1 | 5/2007 | Venkatachalam |
| 2007/0142089 A1 | 6/2007 | Roy et al. |
| 2007/0173203 A1* | 7/2007 | Fei et al. ............ 455/69 |
| 2009/0041144 A1 | 2/2009 | Biswas et al. |

FOREIGN PATENT DOCUMENTS

| | | |
|---|---|---|
| WO | WO-0186993 A1 | 11/2001 |
| WO | WO-2005053235 A1 | 6/2005 |
| WO | WO-2007002805 A1 | 1/2007 |
| WO | WO-2007002924 A1 | 1/2007 |

OTHER PUBLICATIONS

"U.S. Appl. No. 11/172,452, Response filed Jun. 23, 2009 to Non Final Office Action mailed Apr. 8, 2009", 13 pigs.

"U.S. Appl. No. 11/171,643 Response filed Jun. 9, 2008 to Non-Final Office Action mailed Apr. 14, 2008", 19 pgs.

"U.S. Appl. No. 11/171,643 Non-Final Office Action mailed Apr. 14, 2008", 15 Pgs.

"U.S. Appl. No. 11/172,449 Non-Final Office Action mailed Apr. 9, 2008", 16 pgs.

"U.S. Appl. No. 11/172,451 Notice of Allowance mailed May 9, 2008.", 6 pgs.

"U.S. Appl. No. 11/172,451 Response filed Apr. 10, 2008 to Final Office Action mailed Feb. 29, 2008", 10 pgs.

"U.S. Appl. No. 11/172,451 Response filed Dec. 11, 2007 in response to Non-Final Office Action mailed Oct. 16, 2007", 16 pgs.

"U.S. Appl. No. 11/172,451 Final Office Action mailed Feb. 29, 2008", 10 pgs.

"International Search Report for corresponding PCT Application No. PCT/US2006/025305", (Oct. 31, 2006), 3 pgs.

"International Search Report for corresponding PCT Application No. PCT/US2006/025777", (Oct. 27, 2006), 5 pgs.

"U.S. Appl. No. 11/172,451 Non-Final Office Action Mailed Oct. 16, 2007", 13 pgs.

Biswas, A., et al., "Channel Estimation Techniques With Long Training Sequence for IEEE 802.11A", *2004 International Conference on Signal Processing & Communications (SPCOM '04)*, (2004), 136-139.

Cui, T., et al., "Robust Joint Frequency Offset and Channel Estimation for OFDM Systems", *IEEE 60th Vehicular Technology Conference (VTC 2004-Fall)*, vol. 1., (2004), 603-607.

Egashira, N., et al., "Improvement of CCI Compensation Accuracy Using Feedback Phase Tracking in MIMO-OFDM Systems", *IEEE Global Telecommunications Conference (GLOBECOM '04)*, vol. 2, (2004), 923-927.

Frenkiel, R. H., et al., "The Infostations Challenge: Balancing Cost and Ubiquity in Delivering Wireless Data", *IEEE Personal Communications*, vol. 7, (Apr. 2000), 66-71.

Moose, P. H., "A Technique for Orthogonal Frequency Division Multiplexing Frequency Offset Correction", *IEEE Transactions on Communications*, 42(10), (Oct. 1994), 2908-2914.

Pun, M., et al., "An EM-Based Joint Maximum Likelihood Estimation of Carrier Frequency Offset and Channel for Uplink OFDMA Systems", *IEEE 60th Vehicular Technology Conference (VTC 2004)*, (2004), 598-602.

Yu, C.-Y., et al., "Design and Simulation of a MIMO OFDM Baseband Transceiver for High Throughput Wireless LAN", *Proceedings, 2004 IEEE Asia-Pacific Conference on Circuits and Systems*, vol. 1, (2004), 205-208.

"U.S. Appl. No. 11/172,452 Office Action mailed Sep. 9. 2009", 11 pgs.

"U.S. Appl. No. 11/172,452, Response filed Nov. 9, 2009 to Final Office Action mailed Sep. 9, 2009", 12 pgs.

"U.S. Appl. No. 11/172,452, Notice of Allowance mailed Nov. 24, 2009", 6 pgs.

\* cited by examiner 416  417
LTF 1 = $\{f_0, f_3, f_6, \ldots, f_{60}\}$ 418  419
LTF 2 = $\{f_1, f_4, f_7, \ldots, f_{61}\}$ 420  421
LTF 3 = $\{f_2, f_5, f_8, \ldots, f_{62}\}$ 422  423
LTF 4 = $\{f_3, f_6, f_9, \ldots, f_{63}\}$

*FIG. 4B*

WIRELESS COMMUNICATION DEVICE AND METHOD FOR REDUCING CARRIER FREQUENCY OFFSETS OVER A SIMULTANEOUS MULTI-USER UPLINK IN A MULTICARRIER COMMUNICATION NETWORK

This application is a continuation of U.S. patent application Ser. No. 11/172,451, filed on Jun. 29, 2005, now issued as U.S. Pat. No. 7,426,199, which is incorporated herein by reference in its entirety.

CROSS REFERENCE TO RELATED APPLICATIONS

This patent application is related to U.S. patent application Ser. Nos. 11/172,449, 11/172,452, and 11/171,643 filed concurrently herewith.

TECHNICAL FIELD

Some embodiments of the present invention pertain to multicarrier communication systems. Some embodiments of the present invention pertain to wireless networks.

BACKGROUND

In a multicarrier communication system, such as a system that uses orthogonal frequency division multiplexing (OFDM), orthogonal subcarriers are used to convey data. The orthogonality of these subcarriers is important to maintain a low signal-to-noise and interference ratio (SNIR) and as well as reduce inter-symbol interference (ISI). One difficulty with receiving communications from more than one communication station is that the orthogonality of the subcarriers in the channel and at the receiver is affected by slight differences between each communication station's transmission frequencies. These slight differences may be referred to as a carrier frequency offset. Thus, there are general needs for estimating and compensating for carrier frequency offset when receiving from multiple transmitting stations.

BRIEF DESCRIPTION OF THE DRAWINGS

FIG. 4B illustrates an example of interleaved frequencies of long-training fields of the uplink packets of FIG. 4A in accordance with some embodiments of the present invention;

DETAILED DESCRIPTION

The following description and the drawings illustrate specific embodiments of the invention sufficiently to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of others. Embodiments of the invention set forth in the claims encompass all available equivalents of those claims. Embodiments of the invention may be referred to, individually or collectively, herein by the term "invention" merely for convenience and without intending to limit the scope of this application to any single invention or inventive concept if more than one is in fact disclosed.

Figure 1:
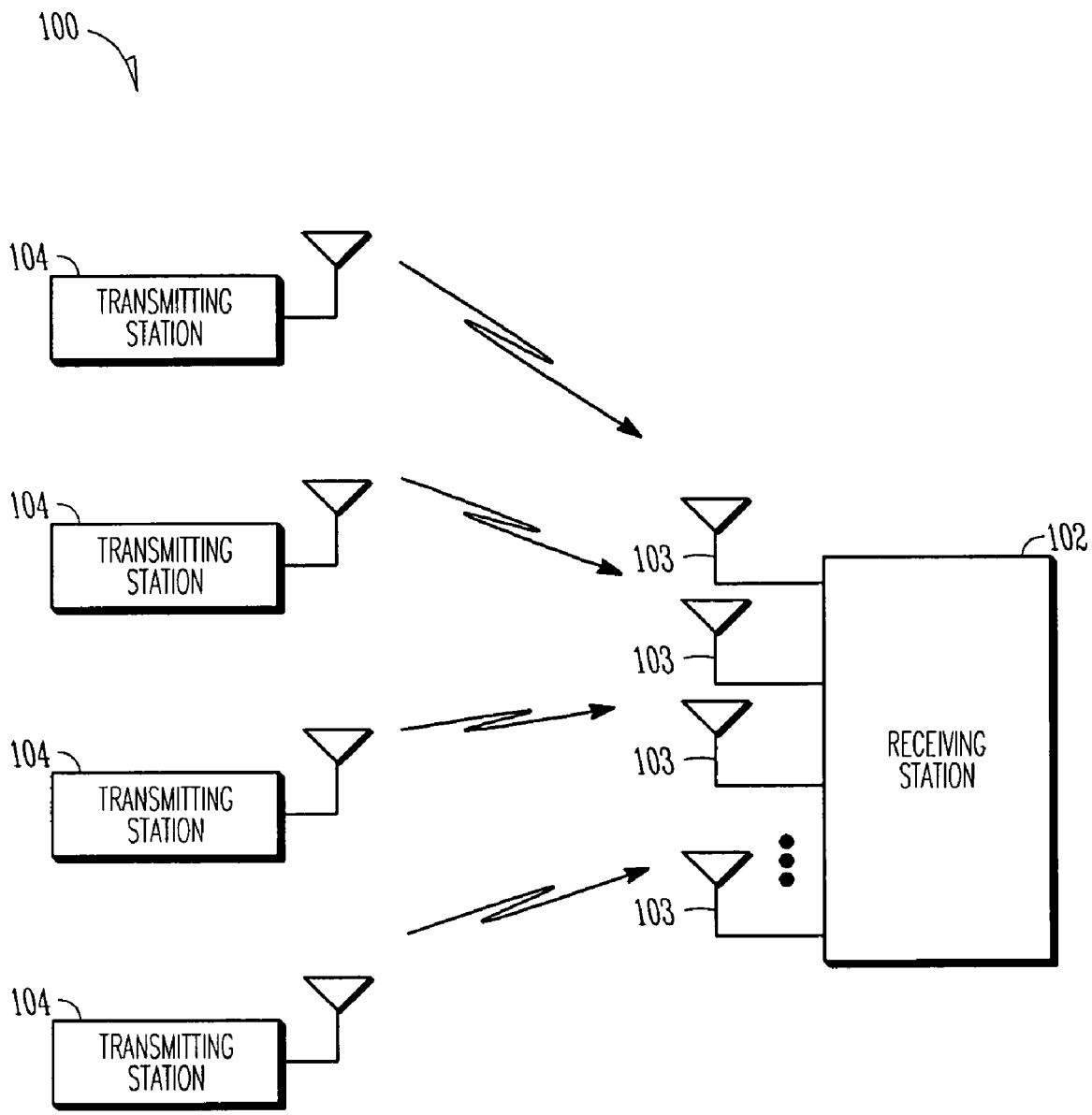
FIG. 1 illustrates a wireless communication network in accordance with some embodiments of the present invention.

FIG. 1 illustrates a wireless communication network in accordance with some embodiments of the present invention. Wireless network 100 comprises receiving station 102 and one or more transmitting stations 104. Receiving station 102 may provide for communications between associated transmitting stations 104 and may allow associated transmitting stations 104 to communicate with one or more external networks, such as the Internet. In some embodiments, receiving station 102 and transmitting stations 104 may comprise multiple-input multiple-output (MIMO) communication stations which use a plurality of antennas for communicating. Although in FIG. 1, transmitting stations 104 are illustrated with a single antenna and receiving station 102 is illustrated with four antennas, the scope of the invention is not limited in this respect. In some embodiments, transmitting stations 104 and receiving station 102 may have as few as two antennas and up to ten more antennas.

In accordance with some embodiments of the present invention, receiving station 102 employs a multi-user uplink with more than one of transmitting stations 104. In these embodiments, latency may be reduced for applications operating on transmitting stations 104. The applications may include time-sensitive applications, such as voice over IP (VoIP) or streamed video applications, which may have time-sensitive packet transmission requirements. In some embodiments, the applications may include applications having quality-of-service (QOS) level requirements. Quality-of-service level requirements may include data rate requirements, error rate requirements and/or packet priority requirements. In some embodiments, the quality-of-service level requirements may be based on the information content of the communications. The applications may also include less time-sensitive applications such as applications that communicate best-effort traffic as well as background traffic. Although some embodiments of the present invention are described reducing latency for time-sensitive applications, the scope of the invention is not limited in this respect, as some embodiments are equally applicable to almost any communication application operating on a transmitting or a receiving station. In some embodiments, time-sensitive applications may refer to any communication application having a packet-latency requirement.

In some embodiments, power consumption of transmitting stations 104 or receiving station 102 may also be reduced. In some embodiments, receiving station 102 may concurrently receive uplink data packets through two or more receive antennas from two or more transmitting stations 104 on the same frequency subcarriers of a multicarrier communication channel. In these embodiments, receiving station 102 may internally separate the uplink data transmitted by the two or more transmitting stations 104 using channel estimates for each transmitting station from which a transmission is received. In some embodiments, receiving station 102 may take advantage of the antenna diversity resulting from differently located transmitting stations 104. These embodiments are discussed in more detail below.

In accordance with some embodiments of the present invention, receiving station 102 receives training signals that were concurrently transmitted from transmitting stations 104. The training signals are received through each receive antenna 103 of receiving station 102. Receiving station 102 generates channel estimates and carrier frequency offset (CFO) estimates for each of transmitting stations 104 from the received training signals by performing an iterative decoding process using previously generated channel estimates and previously generated CFO estimates to cancel intercarrier interference (ICI) from the received training signals. The ICI may result from a loss of subcarrier orthogonality induced by carrier frequency offsets. These embodiments are described in more detail below.

In some embodiments, transmitting stations 104 are polled to simultaneously respond. In some embodiments, each transmitting station 104 may use part of a preamble so that the transmitting stations together form a virtual MIMO system. In some embodiments, the preamble may be a standard preamble, such as a standard preamble in accordance with the IEEE 802.11(n) standard referenced below, although the scope of the invention is not limited in this respect. Receiving station 102 may have an equal or greater number of antennas 103 than the number of selected transmitting stations 104 to resolve the spatial streams transmitted by the transmitting stations.

In accordance with some embodiments of the present invention, each of transmitting stations 104 may estimate a CFO from a downlink polling frame that is transmitted by receiving station 102. In these embodiments, transmitting stations 104 apply the CFO estimate to signals prior to and during transmission. Accordingly, the orthogonality of subcarriers may be substantially maintained thus reducing ICI, among other things. Furthermore, the complexity of signal processing that needs to be performed by receiving station 102 to compensate for CFOs of transmitting stations 104 may be reduced. These embodiments are discussed in more detail below.

In some embodiments, transmitting stations 104 and receiving station 102 may be part of separate wireless communication devices that may communicate multicarrier communication signals, such as orthogonal frequency division multiplexed (OFDM) communication signals, or orthogonal frequency division multiple access (OFDMA) communication signals, although the scope of the invention is not limited in this respect. The multicarrier signals may be communicated over a multicarrier communication channel. The multicarrier communication channel may be within a predetermined frequency spectrum and may comprise a plurality of orthogonal subcarriers. In some embodiments, the orthogonal subcarriers may be closely spaced OFDM subcarriers. To help achieve orthogonality between the closely spaced subcarriers, each subcarrier may have an integer number of cycles within a symbol period, although the scope of the invention is not limited in this respect. In some other embodiments, transmitting stations 104 and receiving station 102 may communicate spread-spectrum signals, although the scope of the invention is not limited in this respect.

In some embodiments, receiving station 102 may be referred to as a managing wireless communication device 102. Examples of managing wireless communication devices may include wireless access points (APs), Wireless Fidelity (WiFi) communication stations, Worldwide Interoperability for Microwave Access (WiMax) communication stations, or broadband communication stations, although the scope of the invention is not limited in this respect as receiving station 102 may be almost any wireless communication device. In some embodiments, transmitting stations 104 may be referred to as communication stations (STAs), such as WiFi, WiMax, or broadband communication stations, although the scope of the invention is not limited in this respect.

In some embodiments, the frequency spectrums for the communication signals communicated by transmitting stations 104 and receiving station 102 may comprise either a 5 GHz frequency spectrum or a 2.4 GHz frequency spectrum. In these embodiments, the 5 GHz frequency spectrum may include frequencies ranging from approximately 4.9 to 5.9 GHz, and the 2.4 GHz spectrum may include frequencies ranging from approximately 2.3 to 2.5 GHz, although the scope of the invention is not limited in this respect, as other frequency spectrums are also equally suitable. In some broadband and WiMax embodiments, the frequency spectrum for communications may comprise frequencies between 2 and 11 GHz, although the scope of the invention is not limited in this respect.

In some embodiments, stations 102 and 104 may communicate in accordance with specific communication standards, such as the Institute of Electrical and Electronics Engineers (IEEE) standards including IEEE 802.11(a), 802.11(b), 802.11(g), 802.11(h) and/or 802.11 (n) standards for wireless local area networks (WLANs), although stations 102 and 104 may also be suitable to transmit and/or receive communications in accordance with other techniques. In some broadband and WiMax embodiments, stations 102 and 104 may transmit and receive broadband wireless communications in accordance with the IEEE 802.16(e) standards for wireless metropolitan area networks (WMANs). For more information with respect to IEEE 802.11 and the IEEE 802.16 standards, please refer to "IEEE Standards for Information Technology—Telecommunications and Information Exchange between Systems—Local and Metropolitan Area Network—Specific Requirements—Part 11: Wireless LAN Medium Access Control (MAC) and Physical Layer (PHY), ISO/IEC 8802-11: 1999" and related amendments/versions.

In some embodiments, stations 102 and/or 104 may be part of portable wireless communication devices, such as personal digital assistants (PDAs), laptop or portable computers with wireless communication capability, web tablets, wireless telephones, wireless headsets, pagers, instant messaging devices, digital cameras, access points, televisions or other device that may receive and/or transmit information wirelessly.

Station 102 is referred to as a receiving station and stations 104 are referred to as transmitting stations for convenience, and the terms transmitting and receiving are not meant to be limiting in any way. In some embodiments, receiving station 102 and transmitting stations 104 may include both transmitting and receiving functionality.

Figure 2:
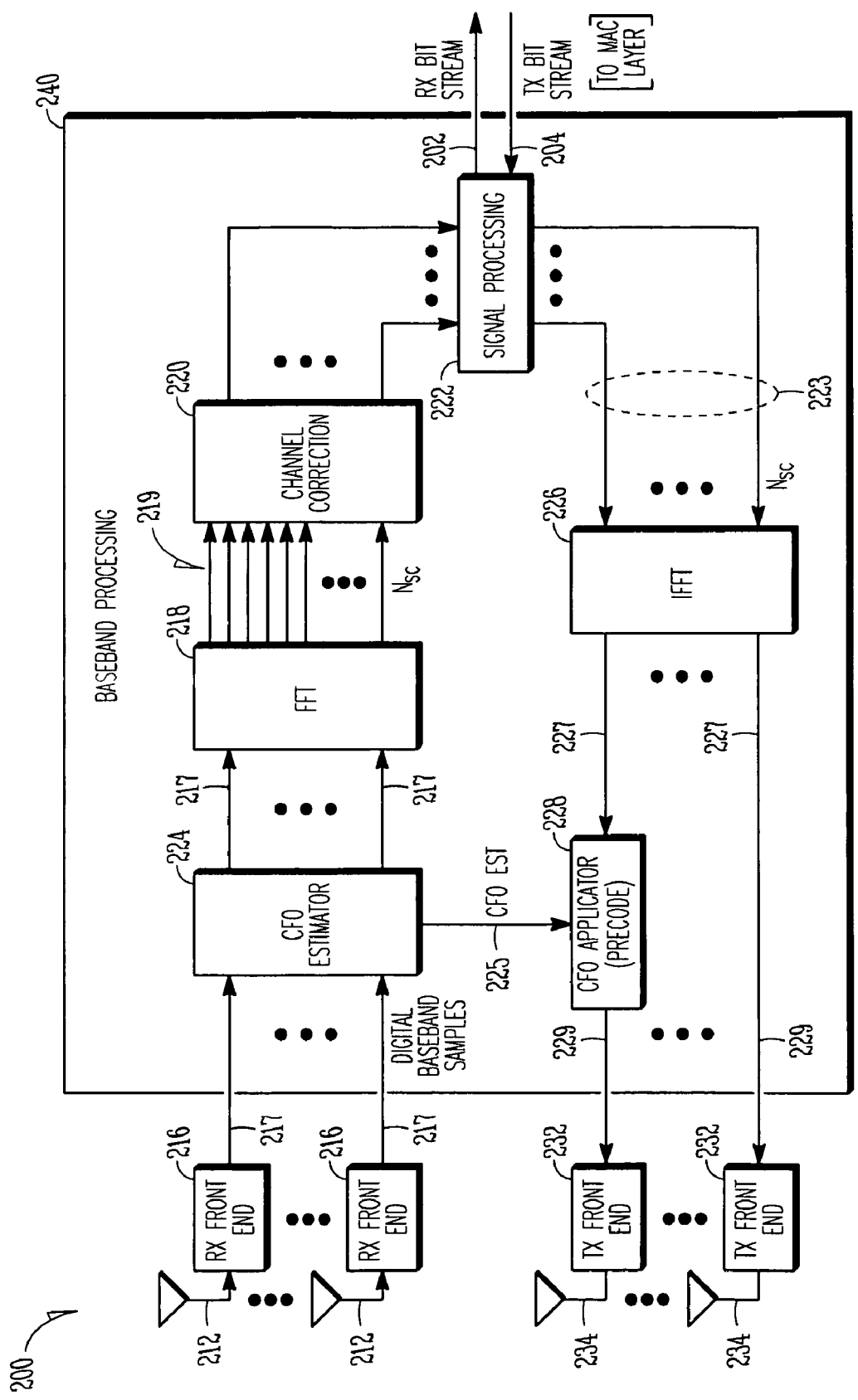
FIG. 2 is a block diagram of a wireless communication device in accordance with some embodiments of the present invention.

FIG. 2 is a block diagram of a wireless communication device in accordance with some embodiments of the present invention. Wireless communication device 200 may be suitable for use as one of transmitting stations 104 (FIG. 1), although other wireless communication device configurations may also be suitable. In some embodiments, wireless communication device 200 may be MIMO communication station (STA). FIG. 2 illustrates circuitry of a portion of a wireless communication device referred to as the physical (PHY) layer.

Wireless communication device 200 includes receiver (RX) front-end circuitry 216 for receiving multicarrier signals from a transmitting station and generating baseband samples 217. Wireless communication device 200 may also include transmitter (TX) front-end circuitry 232 to generate multicarrier RF signals from baseband samples 229 and transmit the multicarrier signals to a transmitting station. Wireless communication device 200 also comprises baseband processing circuitry 240 to generate one or more receive bit streams 202 from receiver baseband samples 217. Baseband processing circuitry 240 may also generate transmitter baseband samples 229 from one or more transmit bit streams 204.

In accordance with some embodiments, baseband processing circuitry 240 includes carrier frequency offset (CFO) estimating circuitry 224 to generate CFO estimates 225 from a received downlink polling frame and CFO application circuitry 228 to apply CFO estimates 225 to signals prior to transmission.

On the receiver side, wireless communication device 200 also comprises Fourier transform circuitry 218 to perform a discrete Fourier transform (DFT), such as a fast Fourier transform (FFT), on baseband samples 217 and generate Fourier coefficients 219. Fourier coefficients 219 may include a frequency-domain signal for each subcarrier of the received multicarrier signal for a total number of $N_{sc}$ subcarriers. In some embodiments, the number of subcarriers may range from as few as 16 to up to 64, 128 and 256. In some embodiments, the number of subcarriers may range from several hundred to up to several thousand. Wireless communication device 200 also includes channel correction circuitry 220 which may perform an equalization on Fourier coefficients 219, and signal processing circuitry 222 to further process the frequency-domain signals to generate one or more receive bit streams 202. In some MIMO embodiments, each spatial data stream that was transmitted to wireless communication device 200 may be separated in circuitry 222, although the scope of the invention is not limited in this respect.

On the transmitter side, wireless communication device 200 also comprises inverse Fourier transform circuitry 226 to perform an inverse discrete Fourier transform (IDFT), such as an inverse fast Fourier transform (IFFT), on Fourier coefficients 223 to generate baseband samples 227. Signal processing circuitry 222 may generate Fourier coefficients 223 for each subcarrier of a multicarrier communication signal that may be transmitted by wireless communication device 200. In some MIMO embodiments, signal processing circuitry 222 may generate Fourier coefficients 223 for each subcarrier and for each spatial data stream or channel. In these MIMO embodiments, inverse Fourier transform circuitry 226 may generate separate baseband samples for each transmitter front-end circuitry 232, although the scope of the invention is not limited in this respect.

In some MIMO embodiments, wireless communication device 200 may have as few as two and up to ten or more receive-signal paths and as few as two and up to ten or more transmit-signal paths. Each receive-signal path may comprise one of antennas 212 and an associated one of RX front-end circuitry 216. Similarly, each transmit-signal path may comprise one of antennas 234 and an associated one of TX front-end circuitry 232. In some embodiments, each transmit-signal path may be associated with and may transmit a separate data stream, although the scope of the invention is not limited in this respect.

In some embodiments, signal processing circuitry 222 may include error-correction encoding and decoding functionality, interleaving and deinterleaving functionality and quadrature-amplitude modulation (QAM) mapping and demapping functionality, although the scope of the invention is not limited in this respect.

Although wireless communication device 200 is illustrated as having several separate functional elements, one or more of the functional elements may be combined and may be implemented by combinations of software-configured elements, such as processing elements including digital signal processors (DSPs), and/or other hardware elements. For example, some elements of baseband processing circuitry 240 may comprise one or more microprocessors, DSPs, application specific integrated circuits (ASICs), and combinations of various hardware and logic circuitry for performing at least the functions described herein. In some embodiments, the functional elements of baseband processing circuitry 240 may refer to one or more processes operating on one or more processing elements.

Antennas 212 and 234 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used.

Figure 3:
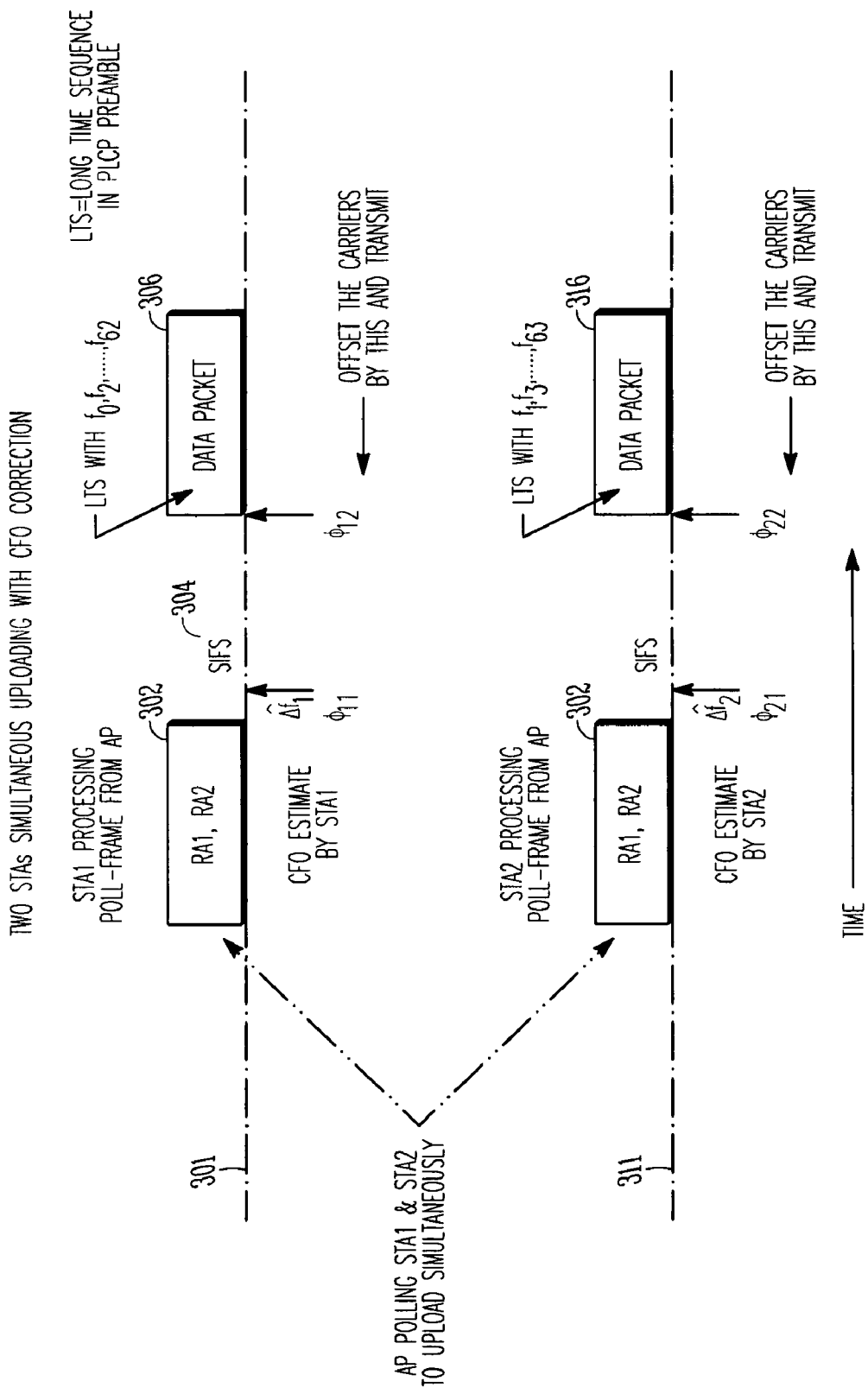
FIG. 3 illustrates the timing of communications of two communication stations in accordance with some embodiments of the present invention.

FIG. 3 illustrates the timing of communications of two transmitting stations 104 (FIG. 1) in accordance with some embodiments of the present invention. In FIG. 3, time line 301 illustrates polling frame 302 received by a first communication station (i.e., a first of transmitting stations 104 (FIG. 1)) and subsequent uplink data packet 306 transmitted by the first communication station after time delay 304. Time line 311 illustrates polling frame 302 received by a second communication station (i.e., a second of transmitting stations 104 (FIG. 1)) and subsequent uplink data packet 316 transmitted by the second communication station after the time delay. In these embodiments, polling frame 302 may be transmitted by a managing communication station, such as receiving station 102 (FIG. 1). Polling frame 302 may be addressed to each transmitting station 104 (FIG. 1). In this example, polling frame 302 may be addressed two communication stations 104 having receiver addresses RA1 and RA2. In response to polling frame 302, each transmitting station, after short time delay 304, may concurrently transmit its uplink packet (e.g., either packet 306 or 316) based on information in polling frame 302. In these embodiments, each transmitting station 104 (FIG. 1) may generate a CFO estimate from received polling frame 302 and may apply the CFO estimates to the station's simultaneous transmissions of the uplink packet (e.g., either packet 306 or 316).

In some embodiments, receiving station 102 (FIG. 1) performs an initial CFO estimation during the receipt of a short training field (STF) that may be part of uplink packets 306 and 316. CFO correction along with channel estimation may be performed during receipt of a long training preamble (LTF) that may be part of uplink packets 306 and 316. In some of these embodiments, each uplink packet may include the STF, the LTF, a data field and a cyclic prefix, although the scope of the invention is not limited in this respect.

Referring back to FIG. 2, in some embodiments, CFO estimating circuitry 224 generates CFO estimates 225 from digital baseband samples 217 from one receive antenna of a plurality of receive antennas 212. In some other embodiments, CFO estimating circuitry 224 may generate CFO estimates from digital baseband samples 217 from more that one of receive antennas 212, although the scope of the invention is not limited in this respect. In these embodiments, CFO estimating circuitry 224 may use additional baseband samples 217 from other receive-signal paths possibly generating a more accurate CFO estimate and/or possibly generating the CFO estimate quicker. Although CFO estimating circuitry 224 is illustrated as receiving baseband samples 217 from more than one receive-signal path, the scope of the invention is not limited in this respect. In some embodiments, CFO estimating circuitry 224 may select any one or more of the receive-signal paths for receipt of baseband samples 217.

In some embodiments, receiver front-end circuitry 216 may generate baseband samples 217 from polling frame 302 (FIG. 3) and may provide baseband samples 217 to CFO estimating circuitry 224. Baseband samples 217 may be digital time-domain samples. In these embodiments, CFO estimating circuitry 224 may generate CFO estimates 225 from baseband samples 217, and CFO application circuitry 228 may apply CFO estimates 225 to transmit baseband samples 227 prior to transmission by transmitter front-end circuitry 232.

In some embodiments, receiver front-end circuitry 216 may comprise RF receive circuitry, down-converter circuitry and analog-to-digital conversion (ADC) circuitry to generate and to provide baseband signals 217 to baseband processing circuitry 240. In some embodiments, transmitter front-end circuitry 232 may comprise digital-to-analog conversion (DAC) circuitry, up-converter circuitry and RF transmitter circuitry to generate RF signals for transmission from transmitter baseband samples 229 provided by baseband processing circuitry 240.

In some embodiments, wireless communication device 200 may have a plurality of RF receive signal paths. Each RF receive signal path may be associated with one of receiver front-end circuitry 216 and may generate receive baseband signals 217 from an associated receive antenna 212. In some embodiments, the plurality of receive signal paths may be viewed as multi-channel receiver.

In some embodiments, wireless communication device 200 may also have a plurality of RF transmit signal paths. Each RF transmit signal path may be associated with one of transmitter front-end circuitry 232 and may generate RF signals from transmit baseband signals 229 for transmission by an associated transmit antenna 234. CFO application circuitry 228 may apply CFO estimates 225 to transmit baseband samples 227 prior to transmission by RF transmit circuitry 232 associated with a single one of transmit antennas 234 which transmits an uplink packet over the multi-user uplink.

In some embodiments, CFO estimating circuitry 224 may determine an estimated phase rotation of constellation points based on a preamble of polling frame 302 (FIG. 3), which may have predetermined or known characteristics. CFO application circuitry 228 may apply an equivalent opposite phase rotation to the baseband samples prior to and during transmission of uplink packet 306 (FIG. 3). The equivalent opposite phase rotation may be opposite to the estimated phase rotation determined by CFO estimating circuitry 124. In some embodiments, CFO estimating circuitry 224 may determine the estimated phase rotation of constellation points based on a known training sequence or a known training field, such as a short training field in a preamble of polling frame 306 (FIG. 3), although the scope of the invention is not limited in this respect. In some embodiments, the preamble may be a physical-layer convergence protocol (PLCP) preamble, although the scope of the invention is not limited in this respect.

In some embodiments, CFO estimating circuitry 224 may update CFO estimates 225 for each OFDM symbol received in polling frame 306. In some embodiments, baseband samples 217 may be generated from each received OFDM symbol and an updated CFO estimate may be generated from each set of these samples, although the scope of the invention is not limited in this respect. In some embodiments, CFO estimating circuitry 224 may also update the CFO estimates 225 for each OFDM symbol received in subsequent packets from receiving station 102 (FIG. 1), although the scope of the invention is not limited in this respect.

In some embodiments, CFO estimating circuitry 224 may update CFO estimates 225 during time-delay 304 (FIG. 3) between receipt of polling frame 302 (FIG. 3) and transmission of uplink packet 306 (FIG. 3). In some embodiments, CFO estimating circuitry 224 updates the CFO estimate until the end of time-delay 304 (FIG. 3). In some embodiments, time delay 304 (FIG. 3) may be a short inter-frequency space (SIFS) time delay between downlink and uplink transmissions, although the scope of the invention is not limited in this respect.

In some embodiments, signal processing circuitry 222 may generate frequency-domain components 223 for portions of uplink packet 306 (FIG. 3) for simultaneous time-synchronized transmission with uplink packet 316 (FIG. 3) from another of transmitting stations 104 (FIG. 1) based on the information for addressed to each transmitting station 104 (FIG. 1) received in polling frame 302 (FIG. 3).

In some embodiments, polling frame 302 (FIG. 3) may be addressed to each transmitting station 104 (FIG. 1) and may comprise a preamble sequence associated with an address of each transmitting station 104 (FIG. 1). Each preamble sequence may be associated with a set of subcarriers of a multicarrier communication channel which is used in the short training field. In these embodiments, transmitting stations 104 (FIG. 1) may concurrently transmit a preamble portion on the set of subcarriers indicated by the preamble sequence. The preamble may include the training fields of the uplink packets and may comprise short and long training fields, discussed in more detail below.

Referring back to FIG. 1, the precoding of CFO corrections to uploaded packets of a multi-user uplink discussed above may simplify the complexity of CFO estimation and correction by an access point by helping to preserve the orthogonality of the OFDM subcarriers of the multi-user uplink. In some WLAN embodiments, receiving station 102, operating as an AP, may operate in a contention-free mode in which receiving station 102 polls selected ones of transmitting stations 104 (e.g., $STA_1$, $STA_2$, ..., $STA_M$) for simultaneous uplink transmissions. In these embodiments, the receiving station 102 may have M×M or greater MIMO capability where M is the number of receive antennas 103 and the maximum number of transmitting stations 104. M may range from as few as two to as great as ten or more. In these embodiments, each transmitting station 104 (e.g., $STA_1$, $STA_2$, ..., $STA_M$) may have more than one transmit antenna but each station may use only a single antenna for transmitting an uplink packet, such as packet 306 (FIG. 3). In these embodiments, the CFO correction by all selected transmitting stations while uploading packets concurrently may be performed as follows:

(i) Receiving station 102 (FIG. 1) initiates a contention-free (CF) mode by sending CF-polling frame along with the M number of stations' receiver addresses (RAs) of transmitting stations 104 (FIG. 1) to respond concurrently.
  (ii) The polled stations process the CF-polling frame and estimate the CFOs with respect to receiving station 102 (FIG. 1). For example, $STA_1$, $STA_2$, ..., $STA_M$ estimate CFOs with respect to receiving station 102 (FIG. 1) as $\Delta f_1$, $\Delta f_2$ $\Delta f_M$ respectively while processing polling frame 302 (FIG. 3).

(iii) At the end of CF-polling frame, $STA_1, STA_2, \ldots, STA_M$ compute $\Delta \hat{f}_1, \Delta \hat{f}_2, \ldots, \Delta \hat{f}_M$ as latest estimates of the CFOs respectively.

(iv) From the end of polling frame 302 (FIG. 3) until the end of time delay 304 (FIG. 3), the transmitting stations may calculate the new value of CFOs. The new values of $\phi_{11}$ and $\phi_{12}$ may be obtained as $\phi_{21}$ and $\phi_{22}$ at the end of time delay 304 (FIG. 3), as illustrated in FIG. 3.

(v) The transmitting stations (STA1, STA2, . . . , STA-M) may concurrently respond with their data packets after the expiry of time delay 304 (FIG. 3). While responding, transmitting stations 104 may offset their subcarriers of OFDM symbols with further updated CFO estimates $$\Delta \hat{\hat{f}}_1, \Delta \hat{\hat{f}}_2, \ldots, \Delta \hat{\hat{f}}_M$$

respectively. In this example, each prior CFO offset $\Delta \hat{f}_1, \Delta \hat{f}_2, \ldots, \Delta \hat{f}_M$ may be further updated with $\phi_{21}$ and $\phi_{22}$ used to compensate the carrier offset of the transmitting stations with respect to the receiving station, as illustrated in FIG. 3.

In some embodiments, CFOs for each OFDM symbol in a data packet, updated by each transmitting station, may help enable the synchronization of carrier frequencies of all transmitting stations 104 (FIG. 1) with respect to the carrier frequency of receiving station 102 (FIG. 1). This possibly improved synchronization may help increase orthogonality among the subcarriers of all the transmitting stations and may help reduce the complexity of estimating the CFOs by receiving stations 102 (FIG. 1) for signals received from transmitting stations 104 (FIG. 1).

The CFO pre-correction by transmitting stations 104 (FIG. 1) on the uplink does not necessarily or completely eliminate the need for receiving station 102 (FIG. 1) to estimate and track the carriers individually from each transmitting station. However, it may help ensure sufficient orthogonality between the uplink subcarriers such that the multiple signals can be separated or isolated in the frequency domain per subcarrier with an equalizer. The different carrier frequencies may then be measured after equalization and may be tracked individually. Uplink channel capacity may therefore be improved, although the scope of the invention is not limited in this respect.

Figure 4A:
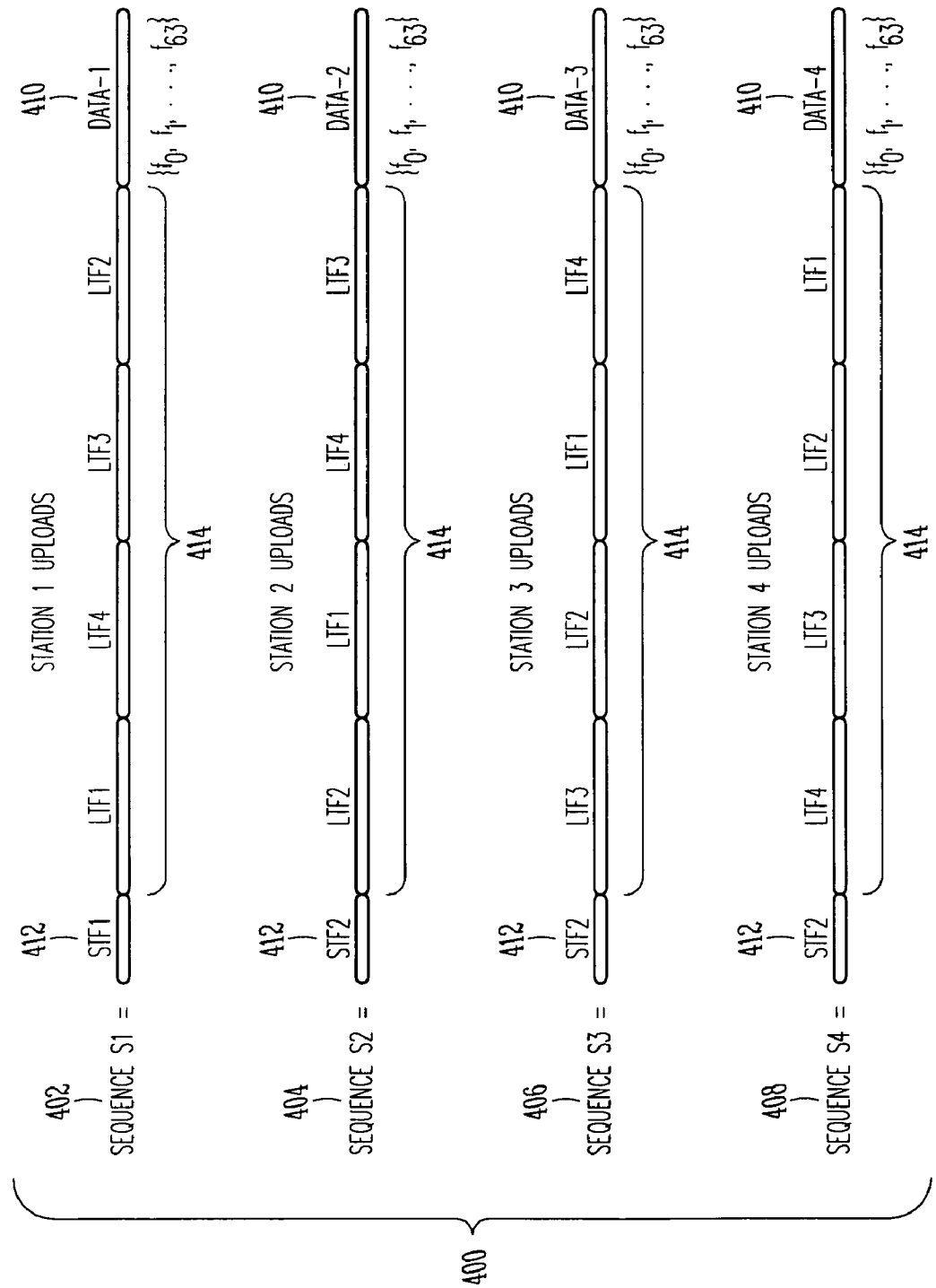
FIG. 4A illustrates the fields of uplink packets transmitted by four communication stations in accordance with some embodiments of the present invention.

FIGS. 4A and 4B illustrate uplink transmissions 400 by four transmitting stations in accordance with embodiments of the present invention. The transmitting stations may correspond to four transmitting stations 104 (FIG. 1) that may communicate over a multi-user uplink with an access point or managing communication device, such as receiving station 102 (FIG. 1). Transmissions 402 may be transmitted by a first transmitting station (i.e., station 1) and may comprise sequence S1, transmissions 404 may be transmitted by a second transmitting station (i.e., station 2) and may comprise sequence S2, transmissions 406 may be transmitted by a third transmitting station (i.e., station 3) and may comprise sequence S3, and transmissions 408 may be transmitted by a forth transmitting station (i.e., station 4) and may comprise sequence S4.

In some embodiments, based on the information in polling frame 302 (FIG. 3), signal processing circuitry 222 (FIG. 2) may generate frequency-domain components of first training field 412 (FIG. 4A) of uplink packet 306 (FIG. 3) using a predetermined set of subcarriers. Each transmitting station 104 (FIG. 1) of a selected plurality may be assigned different frequency subcarriers for the first training field. In some embodiments, based on the information in polling frame 302 (FIG. 3), signal processing circuitry 222 (FIG. 2) may generate the frequency-domain components of second training field 414 (FIG. 4A) of uplink packet 306 (FIG. 3) using sets of frequency-interleaved subcarriers. In some embodiments, signal processing circuitry 222 (FIG. 2) may also generate the frequency-domain components of data field 410 (FIG. 4A) of uplink packet 306 (FIG. 3) using all data subcarriers. Each transmitting station 104 (FIG. 1) may transmit the data field of the station's uplink packet 306 on the same frequency subcarriers on subcarriers of the same frequencies as illustrated in FIG. 4A.

In some embodiments, each station may transmit short training field 412, illustrated as STF1, STF2, STF3 and STF4, following by long training field 414. Long training field 414 comprises a plurality of frequency interleaved training fields 416, 418, 420 and 422 illustrated in FIG. 4B as LTF1, LTF2, LTF3 and LTF4. As shown in FIG. 4B, each of frequency interleaved training fields 416, 418, 420 and 422 comprise a set of frequency-interleaved subcarriers, which in this example, comprise frequency subcarriers between 0 and 63, although the scope of the invention is not limited in this respect. In this way LTF1 416 may be transmitted in subcarriers 417, LTF2 418 may be transmitted in subcarriers 419, LTF3 420 may be transmitted in subcarriers 421 and LTF4 422 may be transmitted in subcarriers 423. In some embodiments, the subcarriers of long training field 414 may comprise sets of orthogonal subcarriers 417, 419, 421 and 423 illustrated in FIG. 4B. In some alternate embodiments, short training field 412 may also comprise sets of orthogonal subcarriers 417, 419, 421 and 423 illustrated in FIG. 4B, although the scope of the invention is not limited in this respect.

FIG. 4A also illustrates the transmission of data field 410 by each of the transmitting stations. In these example embodiments, all four transmitting stations may transmit their data concurrently during data field 410 on the same frequency subcarriers. For example, as illustrated, station 1 may transmit data-1 on frequency subcarriers $f_o, f_1, f_2 \ldots f_{63}$ at about the same time station 2 transmits data-2 on frequency subcarriers $f_o, f_1, f_2 \ldots f_{63}$, at about the same time station 3 transmits data-3 on frequency subcarriers $f_o, f_1, f_2 \ldots f_{63}$, and at about the same time station 4 transmits data-4 on frequency subcarriers $f_o, f_1, f_2 \ldots f_{63}$. Although FIGS. 4A and 4B illustrate example embodiments that use 64 subcarrier frequencies, the scope of the invention is not limited in this respect. In some embodiments, up to several hundred or more subcarrier frequencies may be used. Although FIGS. 4A and 4B illustrate example embodiments of four transmitting stations concurrently uplinking to an access point, the scope of the invention is not limited in this respect as up to ten or more transmitting stations may be configured to transmit to an access point over a multi-user uplink.

Referring to FIGS. 3, 4A and 4B together, in some embodiments, polling frame 302 may be transmitted with a single transmit antenna by receiving station 102 (FIG. 1). In these embodiments, polling frame 302 may be similar to a conventional or legacy packet format, however the single polling station address may be replaced with up to four or more polling station addresses indicating that these stations are being polled and also indicating that these polled stations are to simultaneous uplink packets by using sequences, such as S1, S2, S3 and S4 in an example embodiment of four stations. The sequences may correspond to the polling station addresses in polling frame 302. In these embodiments, the polling frame may be similar to a legacy polling frame with multi-station addresses.

In some alternate embodiments, polling frame 302 may use field-bits or another technique to indicate the addresses and/or a set of subcarriers of a plurality of subcarriers of the multicarrier communication channel for wireless communication devices to use for simultaneous uplink transmissions.

Figure 5:
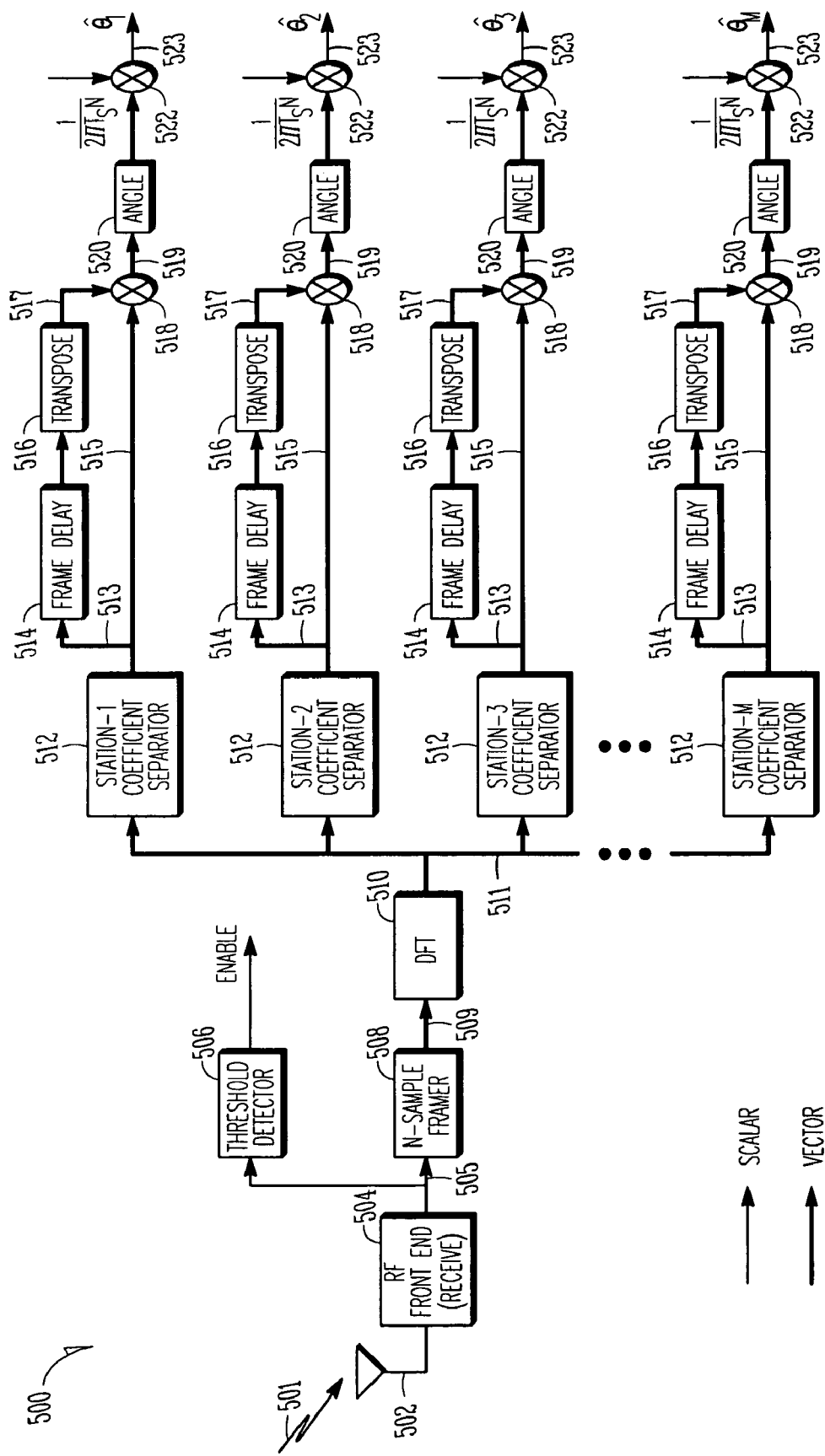
FIG. 5 illustrates a receiver processing path of a managing communication station in accordance with some embodiments of the present invention.

FIG. 5 illustrates a receiver processing path of a managing communication station in accordance with some embodiments of the present invention. Receiver processing path circuitry 500 may correspond to a receive signal path associated with one of receive antennas 103 (FIG. 1) of receiving station 102 (FIG. 1). In these embodiments, antenna 502 may correspond to one of antennas 103 (FIG. 1). In some embodiments, receiving station 102 (FIG. 1) may have one receiver processing path for each receive antenna, although the scope of the invention is not limited in this respect.

Receiver processing path circuitry 500 may generate CFO estimates 523 for each transmitting station 104 (FIG. 1) from a training field received in uplink data packets, such as uplink packets 306 and 316 (FIG. 3), from each transmitting station 104 (FIG. 1). The receiving station may use the CFO estimates to offset baseband samples for processing fields of data packet 306. In some embodiments, transmitting stations 104 may have already applied a CFO to their transmissions as discussed above, although this is not a requirement. In other embodiments, receiver processing path 500 may generate CFO estimates 523 when the stations have not applied a CFO to their transmissions.

In accordance with some embodiments, receiver processing path circuitry 500 comprises RF front-end circuitry 504 to downconvert signals received through antenna 502 and generate digital baseband samples 505. Receiver processing path circuitry 500 may also comprise framer 508 to sample a predetermined number (N) of baseband samples and provide the samples to discrete Fourier transform (DFT) circuitry 510, which may perform an N-point DFT on the samples to generate a set of Fourier coefficients 511. In some embodiment, receiver processing path circuitry 500 may include threshold detector 506 to generate an enable signal when a receive-signal threshold is exceeded, although the scope of the invention is not limited in this respect.

Receiver processing path circuitry 500 may also comprise a plurality of coefficient separators 512. Each coefficient separator 512 may separate Fourier coefficients 511 associated with training signals transmitted by one the transmitting stations. In some embodiments, discrete Fourier transform DFT circuitry 510 may perform a DFT on first and second sets of receive baseband samples 509 associated with the consecutive sets of the separated Fourier coefficients and generate frequency-domain baseband Fourier coefficients 511 for each subcarrier frequency of multicarrier communication signal 501.

Receiver processing path circuitry 500 may also comprise frame-delay circuitry 514 to delay separated Fourier coefficients 513 associated with the first set of baseband samples, and transpose circuitry 516 to perform a transpose on the delayed and separated Fourier coefficients associated with the first set of baseband samples to generate delayed and transposed version 517 of the Fourier coefficients. In some embodiments, transpose circuitry 516 may perform a Hermitian transpose which may include conjugate and transpose operations.

Receiver processing path circuitry 500 may also comprise multiplier 518 to multiply delayed and transposed version 517 of the separated Fourier coefficients associated with a first set of baseband samples with separated Fourier coefficients 515 associated with a second set of baseband samples to generate complex vector output 519 for an associated one of transmitting stations 104 (FIG. 1). The first and second sets of baseband samples may be consecutive sets of N samples, although the scope of the invention is not limited in this respect.

In some embodiments, receiver processing path circuitry 500 may also include angle-argument circuitry 520 to take the argument of complex vector output 519, and multiplying element 522 to multiply complex vector output 519 with a value inversely proportional to the sampling time ($T_s$) and the number of samples (N) to generate CFO estimate 523 for an associated one of the transmitting stations. In some embodiments, multiplying element 522 may multiply complex vector output 519 by $1/(2\pi T_s N)$. In some embodiments, DFT circuitry 510 may perform an N-point DFT in which N may be 64, although other values for N may also be suitable including 128, 256, 512, etc. In these embodiments, frame delay element 514 may delay separated Fourier coefficients 513 by N samples. In this way, multicarrier receiver 500 may use 2N samples to determine CFO estimates 523 for each transmitting station 104 (FIG. 1), although the scope of the invention is not limited in this respect.

Antenna 502 may comprise one or more directional or omnidirectional antennas, including, for example, dipole antennas, monopole antennas, patch antennas, loop antennas, microstrip antennas or other types of antennas suitable for transmission of RF signals.

Although receiver processing path circuitry 500 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, some functional elements illustrated may refer to one or more processes operating on one or more processing elements.

As discussed above in reference to FIG. 4A, each transmitting station may transmit a portion of a preamble (i.e., STF 412) on pre-assigned or predetermined subcarriers of the multicarrier communication channel allowing coefficient selectors 512 to select the subcarriers of one of the transmitting stations. In some embodiments, each transmitting station may transmit the short-training field on a different set of subcarriers. In some embodiments, when two transmitting stations are transmitting concurrently, one transmitting station may be assigned even number subcarriers and the other transmitting station may be assigned the odd-numbered subcarriers. In some embodiments, when four transmitting stations are transmitting concurrently, each of the four transmitting stations may be assigned a different set of subcarriers for transmitting the short training field.

Figure 6:
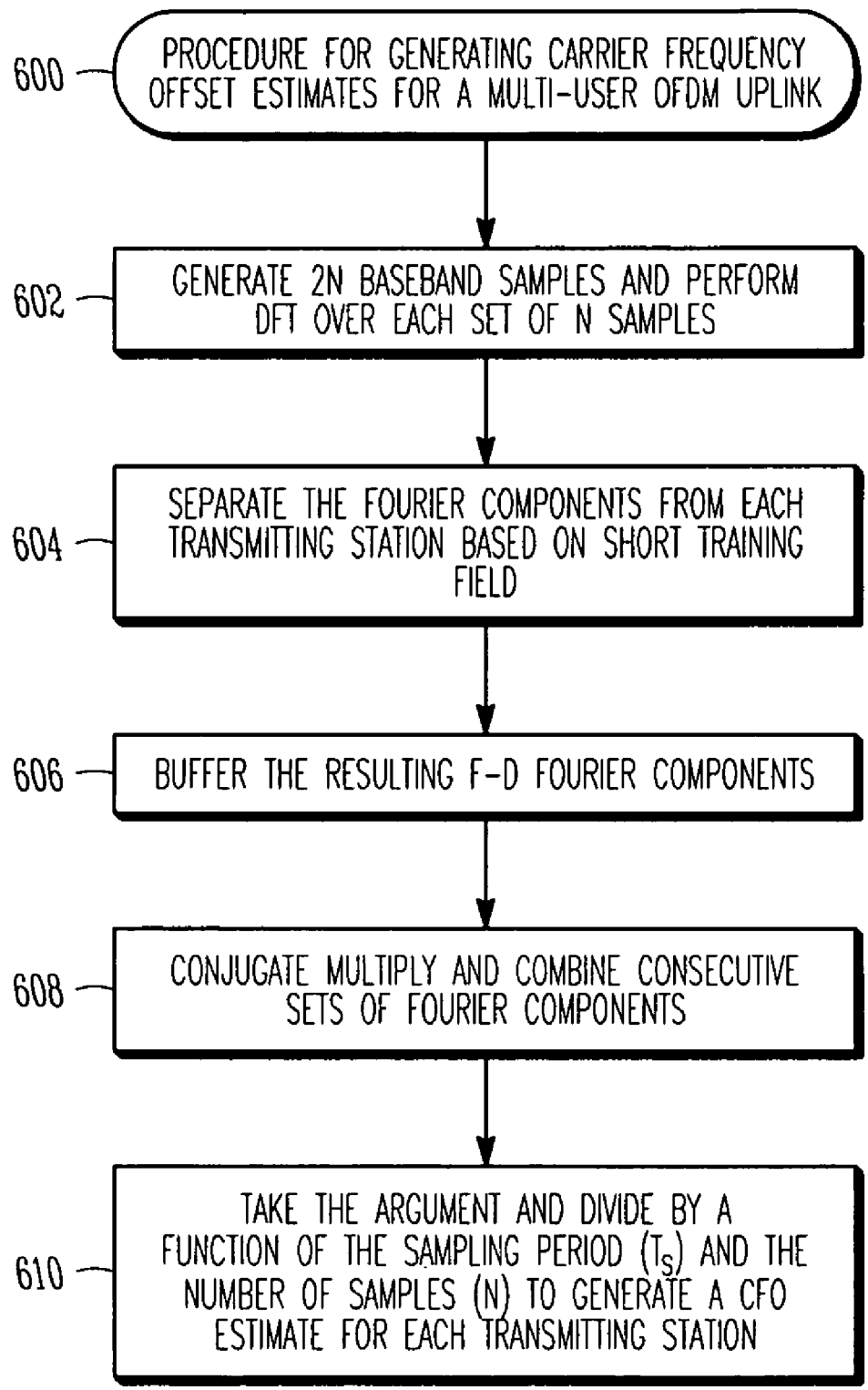
FIG. 6 is a flow chart of a carrier frequency offset generation procedure in accordance with some embodiments of the present invention.

FIG. 6 is a flow chart of carrier frequency offset generation procedure in accordance with some embodiments of the present invention. Carrier frequency offset generation procedure 600 may be performed by receiver processing path circuitry of a receiving station, such as receiver processing path circuitry 500 (FIG. 5), although other circuitry may also be suitable. Carrier frequency offset generation procedure 600 may be used by receiving station 102 (FIG. 1) to generate a CFO estimate for each transmitting station 104 (FIG. 1) that is transmitting concurrently over a multi-user uplink.

Operation 602 comprises generating sets of baseband samples and performing a DFT on each set of baseband samples to generate Fourier coefficients. Operation 602 may comprise performing an N-point DFT on two consecutive sets of N samples. Operation 602 may be performed by DFT circuitry 510 (FIG. 5), although the scope of the invention is not limited in this respect. The baseband samples may be generated from the receipt of a short-training field from a plurality of transmitting stations.

Operation 604 comprises separating the Fourier coefficients associated with each of the transmitting stations. Operation 604 may be performed by coefficient selectors 512 (FIG. 5) which may know which frequency subcarriers are being used by each transmitting station for transmission of the short-training field.

Operation 606 comprises buffering the separated Fourier coefficients associated with the first set of samples. In some embodiments, operation 606 may be performed by frame delay element 514 (FIG. 5), although the scope of the invention is not limited in this respect.

Operation 608 comprises conjugate multiplying and combining the two consecutive sets of Fourier coefficients for an associated transmitting station to generate complex vector output, such as output 519 (FIG. 5), for an associated one of the transmitting stations.

Operation 610 comprises taking the argument of the complex vector output and dividing by a value inversely proportional to the sampling period and the number of samples to generate a CFO estimate, such as CFO estimate 523 (FIG. 5), for each transmitting station.

Although the individual operations of procedure 600 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices.

Embodiments of the invention may be implemented in one or a combination of hardware, firmware and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, electrical, optical, acoustical or other form of propagated signals (e.g., carrier waves, infrared signals, digital signals, etc.), and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims.

In the foregoing detailed description, various features may be occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, invention may lie in less than all features of a single disclosed embodiment. Thus the following claims are hereby incorporated into the detailed description, with each claim standing on its own as a separate preferred embodiment.

What is claimed is:

1. A method for concurrently receiving transmissions from more than one wireless device, the method comprising:
    transmitting a polling frame addressed to each of a plurality of wireless devices using two or more transmit antennas; and
    receiving uplink packets concurrently from each of the wireless devices over a same set of orthogonal frequency division multiplexed (OFDM) subcarriers;
    wherein each wireless device generates a carrier frequency offset (CFO) estimate from the received polling frame and concurrently applies its CFO estimate to the station's simultaneous transmissions of an uplink packet,
    wherein each uplink packet includes a short training field transmitted concurrently by each wireless device on a same set of OFDM subcarriers, followed by a plurality of frequency interleaved long training fields transmitted concurrently by each wireless device on differing sets of OFDM subcarriers.

2. The method of claim 1 wherein transmitting the polling frame and receiving the uplink packets is performed by a multi-antenna base station,
    wherein the short training field and the frequency interleaved long training fields are transmitted using a single transmit antenna of each of the wireless devices, and
    wherein each uplink packet further includes a data field transmitted concurrently by each wireless device on the same set of OFDM subcarriers,
    wherein the method further comprises receiving the short training field, the frequency interleaved long training fields, and the data fields with the two or more transmit antennas of the multi-antenna base station.

3. The method of claim 2 wherein the CFO estimates generated by the wireless devices are transmitter-generated CFO estimates, and
    wherein the method further comprises generating receiver-generated CFO estimates by the multi-antenna base station for each wireless device based on a consecutive set of samples generated from the frequency interleaved long training fields transmitted by each wireless device.

4. The method of claim 3 further comprising:
    separating Fourier coefficients associated with signals transmitted by each of the wireless devices based on information in the frequency interleaved long training fields; and
    conjugate multiplying two consecutive sets of the separated Fourier coefficients to generate the transmitter-generated CFO estimates for each of the wireless devices.

5. The method of claim 3 further comprising:
    generating channel estimates for each wireless device from the frequency interleaved long training fields; and
    separating data from each wireless device in the data field based on the channel estimates.

6. A multi-antenna base station to concurrently communicate with a plurality of wireless devices over an orthogonal frequency division multiplexed (OFDM) channel comprising:
    a transmitter configured to transmit a polling frame addressed to each of the wireless devices using two or more transmit antennas; and a receiver configured to receive uplink packets concurrently from each of the wireless devices over a same set of OFDM subcarriers;

wherein each wireless device generates a carrier frequency offset (CFO) estimate from the received polling frame and concurrently applies its CFO estimate to the station's simultaneous transmissions of an uplink packet, and wherein each uplink packet includes a short training field transmitted concurrently by each wireless device on a same set of OFDM subcarriers, followed by a plurality of frequency interleaved long training fields transmitted concurrently by each wireless device on differing sets of OFDM subcarriers.

7. The multi-antenna base station of claim 6 wherein the short training field and the frequency interleaved long training fields are transmitted using a single transmit antenna of each of the wireless devices, wherein each uplink packet further includes a data field transmitted concurrently by each wireless device on the same set of OFDM subcarriers, and wherein the receiver of the multi-antenna base station is configured to receive the short training field, the frequency interleaved long training fields, and the data fields with the two or more transmit antennas.

8. The multi-antenna base station of claim 7 wherein the CFO estimates generated by the wireless devices are transmitter-generated CFO estimates, and wherein the receiver of the multi-antenna base station is further configured to generate receiver-generated CFO estimates for each wireless device based on a consecutive set of samples generated from the frequency interleaved long training fields transmitted by each wireless device.

9. The multi-antenna base station of claim 8 wherein the receiver of the multi-antenna base station is further configured to:

separate Fourier coefficients associated with signals transmitted by each of the wireless devices based on information in the frequency interleaved long training fields; and conjugate multiply two consecutive sets of the separated Fourier coefficients to generate the transmitter-generated CFO estimates for each of the wireless devices.

10. The multi-antenna base station of claim 8 wherein the receiver of the multi-antenna base station is further configured to:

generate channel estimates for each wireless device from the frequency interleaved long training fields; and separate data from each wireless device in the data field based on the channel estimates.

11. A multicarrier wireless communication device comprising:

carrier frequency offset (CFO) estimating circuitry to generate a CFO estimate from a received polling frame; and CFO application circuitry to apply the CFO estimate to multicarrier signals prior to a transmission of an uplink packet to a multi-antenna base station concurrently with uplink packets transmitted by a plurality of other wireless communication devices, wherein the polling frame is transmitted concurrently to the wireless communication devices from the multi-antenna base station, and wherein each uplink packet includes a short training field transmitted concurrently by each wireless device on a same set of OFDM subcarriers, followed by a plurality of frequency interleaved long training fields transmitted concurrently by each wireless device on differing sets of OFDM subcarriers.

12. The multicarrier wireless communication device of claim 11 wherein the short training field and the frequency interleaved long training fields are transmitted using a single transmit antenna of each of the wireless devices, wherein each uplink packet further includes a data field transmitted concurrently by each wireless device on the same set of OFDM subcarriers, and wherein a receiver of the multi-antenna base station is configured to receive the short training field, the frequency interleaved long training fields, and the data fields with set of two or more transmit antenna.

* * * * *